United States Patent
Yatake

(10) Patent No.: US 7,052,536 B2
(45) Date of Patent: May 30, 2006

(54) WATER-BASED INK

(75) Inventor: Masahiro Yatake, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 165 days.

(21) Appl. No.: 10/677,627

(22) Filed: Oct. 2, 2003

(65) Prior Publication Data

US 2004/0186200 A1 Sep. 23, 2004

(30) Foreign Application Priority Data

| Oct. 2, 2002 | (JP) | ............................. 2002-290004 |
| Oct. 2, 2002 | (JP) | ............................. 2002-290006 |
| Oct. 22, 2002 | (JP) | ............................. 2002-307078 |

(51) Int. Cl.
   *C09D 11/00* (2006.01)
(52) U.S. Cl. ............................... 106/31.43; 106/31.33; 106/31.58; 106/31.59; 106/31.65; 106/31.75; 106/31.86; 106/31.89; 523/160; 523/161
(58) Field of Classification Search ............. 106/31.43, 106/31.58, 31.33, 31.59, 31.75, 31.86, 31.65, 106/31.89; 523/160, 161
See application file for complete search history.

(56) References Cited

U.S. PATENT DOCUMENTS

| 3,974,197 | A | * | 8/1976 | Parliment | .................... | 426/250 |
| 5,972,087 | A | * | 10/1999 | Uraki et al. | .............. | 106/31.65 |
| 5,980,622 | A | * | 11/1999 | Byers | ....................... | 106/31.48 |
| 6,368,397 | B1 | * | 4/2002 | Ichizawa et al. | ......... | 106/31.65 |
| 6,383,275 | B1 | * | 5/2002 | Lin | ......................... | 106/31.27 |
| 6,514,330 | B1 | * | 2/2003 | Kanaya et al. | ........... | 106/31.49 |
| 6,533,851 | B1 | * | 3/2003 | Lee et al. | ................. | 106/31.27 |
| 6,572,227 | B1 | * | 6/2003 | Yamashita et al. | .......... | 347/100 |
| 6,585,817 | B1 | * | 7/2003 | Lee et al. | ................. | 106/31.58 |
| 6,592,657 | B1 | * | 7/2003 | Lee et al. | ................. | 106/31.58 |
| 6,607,589 | B1 | * | 8/2003 | Adamic et al. | .......... | 106/31.49 |
| 2004/0035319 | A1 | * | 2/2004 | Yeh et al. | .................. | 106/31.6 |
| 2005/0075421 | A1 | * | 4/2005 | Yatake | ....................... | 523/179 |

FOREIGN PATENT DOCUMENTS

| JP | 9-239964 | 9/1997 |
| JP | 10-60342 | 3/1998 |
| JP | 11-349875 | 12/1999 |

OTHER PUBLICATIONS

Computer English Translation of JP 9-239964 dated Sep. 16, 1997.
Computer English Translation of JP 10-60342 dated Mar. 3, 1998.
Computer English Translation of JP 11-349875 dated Dec. 21, 1999.

* cited by examiner

*Primary Examiner*—Helene Klemanski
(74) *Attorney, Agent, or Firm*—Ladas & Parry LLP

(57) ABSTRACT

There is provided a water-based ink that gives good coloration and little blurring on regular paper, gives adequate coloration on specialist paper, and has good fixability, and further gives excellent discharge stability with ink jet recording, and moreover exhibits the effect of a chelating agent even in a small amount, and is not harmful due to evaporating, subliming or the like. The water-based ink of the present invention comprises a colorant, water, a water-soluble organic solvent, a surfactant, and a chelating agent, wherein the chelating agent is nitrilotriacetic acid (NTA) or a salt thereof, methylglycine diacetic acid (MGDA) or a salt thereof, L-glutamine diacetic acid (GLDA) or a salt thereof, L-aspartic acid diacetic acid (ASDA) or a salt thereof, diethylenetriamine pentaacetic acid (DTPA) or a salt thereof, gluconic acid (GA) or a salt thereof, citric acid (CA) or a salt thereof, nitrilotripropionic acid (NTP) or a salt thereof, nitrilotrisphosphonic acid (NTPO) or a salt thereof, dihydroxyethylglycine (DHEG) or a salt thereof, hydroxyethyliminodiacetic acid (HIDA) or a salt thereof, 1,3-diamino-2-hydroxypropane tetraacetic acid (DPTA-OH) or a salt thereof, hydroxyethylidene diphosphonic acid (HEDP) or a salt thereof, nitrilotrimethylene phosphonic acid (NTMP) or a salt thereof, or phosphonobutane tricarboxylic acid (PBTC) or a salt thereof.

21 Claims, No Drawings

WATER-BASED INK

BACKGROUND OF THE INVENTION

1. Field of the Invention

The present invention relates to a water-based ink suitable as an ink jet recording ink or the like, for which high print quality or image quality can be obtained on regular paper, recycled paper or coated paper, and moreover storage stability is excellent.

2. Description of the Related Art

With conventional water-based inks, a method has been used in which a dye is dissolved in water or a pigment is dispersed in water. As means for dispersing a pigment in water, a method using a surfactant, and a method using a dispersion polymer having hydrophobic parts and hydrophilic parts are known. Moreover, as methods in which the surface of a colorant is coated with a polymer, for ink jet printer inks, a method using microcapsules containing a dye ink, a method using a microcapsulated pigment obtained by dissolving or dispersing a pigment in a solvent that is insoluble in water and then emulsifying this in water using a surfactant, a method using, in a recording liquid, microcapsules containing a solution or dispersion of a sublimable disperse dye in a water-soluble solvent and at least one type of polyester, a method using a phase inversion emulsification reaction or an acidic precipitation method, and so on are known, and moreover studies are being carried out into ink compositions comprising colored emulsion-polymerized particles and a water-based material.

Various water-based inks have been proposed as described above, but there are few cases in which studies have been carried out toward obtaining long-term storage stability. Moreover, conventionally, an ethylenediamine tetraacetic acid salt has been used in most cases as a chelating agent for water-based inks. As an example in which a nitrilotriacetic acid compound is used, although not as a chelating agent, there is an example in which a dye and a metal coordination compound of Ni, Cu or the like are used, this being to obtain good light-fastness, with no bleeding, and high image density and character quality with an ink jet ink (see, for example, Japanese Patent Application Laid-open No. 9-239964). Moreover, there is an example in which a structure able to coordinate with a metal is introduced into fine polymer particles (see, for example, Japanese Patent Application Laid-open No. 11-349875). Alternatively, there are also examples in which a chelating agent is used in an image recording layer.

As described above, various studies have been carried out into forming pigment-type water-based inks. Pigment-type water-based inks contain a large amount of hardness components such as calcium and magnesium originating from the pigment, and in the case of use as an ink jet ink, hardness components such as calcium and magnesium will also be present on the ink vessel and channels. These hardness components affect pigment dispersion, whereby coagulation becomes prone to occurring. Moreover, conventional dispersions are generally unstable, and if a substance having a hydrophilic part and a hydrophobic part such as a surfactant, a 1,2-alkylene glycol or a glycol ether as used in the present invention is present, then there will be a problem of attachment and detachment becoming prone to occurring, and hence the storage stability of the water-based ink becoming poor. With ordinary water-based inks, a substance having a hydrophilic part and a hydrophobic part such as a surfactant or a glycol ether is necessary to reduce blurring on paper. With an ink in which such substances are not used, the penetrability of the ink into paper is insufficient, and hence there have been problems that the types of paper on which uniform printing can be carried out are limited, and the print quality is prone to dropping.

Furthermore, there has been a problem that if an additive that is used as an essential component in the present invention (in particular, an acetylenic alcohol type surfactant, an acetylenic glycol type surfactant, a silicone type surfactant, diethylene glycol monobutyl ether, triethylene glycol monobutyl ether, propylene glycol monobutyl ether, dipropylene glycol monobutyl ether, or a 1,2-alkylene glycol, or a mixture thereof) is used in a conventional dispersion, then long-term storage stability cannot be obtained, and hence re-dissolution of the ink is poor, and thus the ink dries, and hence clogging is prone to occurring at an ink jet head nozzle, a pen tip or the like.

Moreover, with a pigment that has been dispersed using such a dispersant, there has been a problem that residue from the dispersant remains in the ink system, and the dispersant does not contribute to the dispersion sufficiently, but rather detaches from the pigment, and hence the viscosity becomes high. If the viscosity becomes high, then the amount that can be added of the colorant (pigment etc.) is limited, and hence adequate image quality cannot be obtained, particularly with regular paper such as PPC paper. Moreover, in the case of using a dispersion of a pigment or the like, hardness components such as calcium and magnesium are present as components originating from the pigment or at places that inks contact with in the case of ink jet recording or the like. The dispersion of the pigment or the like will coagulate through such hardness components, and hence it is necessary to eliminate the influence of the hardness components by using a chelating agent. In general an ethylenediamine tetraacetic acid salt is used, but if the amount added thereof is high, then again dispersion will be affected and it will no longer be possible to obtain stability. It has thus been necessary to use a compound that has an effect as a chelating agent even in a small amount. Moreover, with materials that inks such as ink jet recording inks come into contact with the materials, it is necessary to avoid compounds that evaporate, sublime or the like and are thus harmful. Ethylenediamine tetraacetic acid salts are generally considered to be safe, but this only refers to the safety as is or the safety when in the form of an aqueous solution or the like; the safety has not been verified for the case that oxidation occurs during the drying process or through contact with OH radicals in the air with ink jet recording or the like. Moreover, ethylenediamine tetraacetic acid compounds are considered to have poor biodegradability. In particular, ethylenediamine tetraacetic acid itself (i.e. not in the form of a salt) has high toxicity, and is a PRTR designated substance, and moreover ethylenediamine, which is produced through the decomposition of ethylenediamine tetraacetic acid, also has high toxicity, and hence it is preferable to not use ethylenediamine tetraacetic acid, even in small amounts.

SUMMARY OF THE INVENTION

It is an object of the present invention to resolve the above problems, i.e. to provide a water-based ink that gives good coloration and little blurring on regular paper, gives adequate coloration on specialist paper, and has good fixability, and further gives excellent discharge stability with ink jet recording, and moreover exhibits the effect of a chelating agent even in a small amount, and is not harmful due to evaporating, subliming or the like.

A water-based ink of the present invention comprises a colorant, water, a water-soluble organic solvent, a surfactant, and a chelating agent, wherein the chelating agent is nitrilotriacetic acid (NTA) or a salt thereof, methylglycine diacetic acid (MGDA) or a salt thereof, L-glutamine diacetic acid (GLDA) or a salt thereof, L-aspartic acid diacetic acid (ASDA) or a salt thereof, diethylenetriamine pentaacetic acid (DTPA) or a salt thereof, gluconic acid (GA) or a salt thereof, citric acid (CA) or a salt thereof, nitrilotripropionic acid (NTP) or a salt thereof, nitrilotrisphosphonic acid (NTPO) or a salt thereof, dihydroxyethylglycine (DHEG) or a salt thereof, hydroxyethyliminodiacetic acid (HIDA) or a salt thereof, 1,3-diamino-2-hydroxypropane tetraacetic acid (DPTA-OH) or a salt thereof, hydroxyethylidene diphosphonic acid (HEDP) or a salt thereof, nitrilotrimethylene phosphonic acid (NTMP) or a salt thereof, or phosphonobutane tricarboxylic acid (PBTC) or a salt thereof.

DESCRIPTION OF THE PREFERRED EMBODIMENTS

Embodiment A

The present invention provides, as an embodiment thereof, a water-based ink comprising a colorant, water, a water-soluble organic solvent, a surfactant, and a chelating agent, wherein the colorant is a dispersion in which a pigment has been made to be dispersible in water by being enveloped in a polymer or has been dispersed without a dispersant, and the chelating agent is nitrilotriacetic acid or a salt thereof (water-based ink of Embodiment A).

The dispersion according to Embodiment A is the result of carrying out assiduous studies in view of the need for properties such as being able to manufacture an ink that has excellent stability, gives good coloration and little blurring on regular paper, gives adequate coloration on specialist paper, and has good fixability, and further giving excellent discharge stability of the ink from an ink jet head with ink jet recording, and moreover exhibiting the effect of a chelating agent even in a small amount, and not being harmful due to evaporating, subliming or the like.

The water-based ink of Embodiment A is characterized in that nitrilotriacetic acid or a salt thereof is used as the chelating agent. Nitrilotriacetic acid or a salt thereof is stable as a chelating agent in a liquid state such as in an ink, but on a recording medium such as paper, a dry state is formed, and hence the nitrilotriacetic acid or salt thereof is decomposed by OH radicals in the air and becomes safe; nitrilotriacetic acid or a salt thereof is thus suitable for use in a water-based ink that ordinary people frequently come into contact with such as an ink jet ink.

The amount added of the nitrilotriacetic acid or salt thereof is preferably 0.001 to 0.1 wt %. It is usually suitable to use a sodium salt of nitrilotriacetic acid. In the case of using an anionic-dispersed pigment or polymer fine particles in particular, the pH will be on the alkaline side, and hence a mono- to tri-sodium salt is preferable. The counter ion is not limited to being sodium, but rather may also be a monovalent ion such as a potassium ion or a lithium ion, or an ammonium ion, an amine or the like. At less than 0.001%, there will be little effect as a chelating agent, and hence it will no longer be possible to obtain stability due to hardness components such as calcium ions and magnesium ions originating from the pigment or at places of contact with the ink. There will be an effect as a chelating agent even at more than 0.1%, but it will become difficult to stably disperse the pigment and soon. The amount added is more preferably 0.005 to 0.05 wt %. In the case of cationic dispersion, nitrilotriacetic acid not in the form of a salt is preferable.

Moreover, as the colorant, a dispersion in which a pigment has been made to be dispersible in water by being enveloped in a polymer or has been dispersed without a dispersant can be used. By further adding polymer fine particles along with this dispersion, yet higher color density and coloration can be obtained, and moreover the fixability of the pigment onto a medium such as paper can be improved. In particular, adding polymer fine particles is ideal for improving the fixability in the case of a pigment that has been dispersed without using a dispersant.

Moreover, the absolute value of the zeta potential in the state in which the dispersion and the polymer fine particles have been mixed together is preferably at least 30 mV. If the absolute value of the zeta potential is less than 30 mV, then it will no longer be possible to obtain good storage stability due to the influence of additives contained in the material of the ink cartridge or head or the like.

Furthermore, it is preferable for the absolute value of the zeta potential of each of the dispersion and the polymer fine particles independently to be at least 30 mV, and for the absolute value of the difference between the zeta potential of the dispersion and the zeta potential of the polymer fine particles to be not more than 10 mV. If the absolute value of the difference between the zeta potential of the dispersion and the zeta potential of the polymer fine particles exceeds 10 mV, then the storage stability will drop. The absolute value of the difference is more preferably not more than 5 mV.

The colorant is preferably constituted from an organic pigment or an inorganic pigment. For example, for a black ink, examples are types of carbon black (C.I. Pigment Black 7) such as furnace black, lamp black, acetylene black and channel black, metal oxides such as copper oxide, iron oxide (C.I. Pigment Black 11) and titanium oxide, and organic pigments such as aniline black (C.I. Pigment Black 1); for an ink jet recording ink, carbon black is preferable, since the specific gravity is relatively low and hence settling in water is not prone to occurring.

Furthermore, for a colored ink, Pigment Yellows 1 (Fast Yellow G), 3, 12 (Disazo Yellow AAA), 13, 14, 17, 24, 34, 35, 37, 42 (yellow iron oxide), 53, 55, 74, 81, 83 (Disazo Yellow HR), 95, 97, 98, 100, 101, 104, 108, 109, 110, 117, 120, 138, 153 and 180, C.I. Pigment Reds 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G lake), 83, 88, 101 (red iron oxide), 104, 105, 106, 108 (Cadmium Red), 112, 114, 122 (Quinacridone Magenta), 123, 146, 149, 166, 168, 170, 172, 177, 178, 179, 185, 190, 193, 209 and 219, C.I. Pigment Violets 19 and 23, C.I. Pigment Blues 1, 2, 15 (Phthalocyanine Blue R), 15:1, 15:2, 15:3 (Phthalocyanine Blue G), 15:4, 15:6 (Phthalocyanine Blue E), 16, 17:1, 56, 60 and 63, and C.I. Pigment Greens 1, 4, 7, 8, 10, 17, 18 and 36, and soon can be used. Moreover, the particle diameter of the pigment is preferably not more than 5 μm, more preferably not more than 0.3 μm, yet more preferably 0.01 to 0.15 μm.

Moreover, in the case of using a dispersion polymer, it is preferable for a substance from which the dispersion polymer is formed to have one or more hydrophobic groups selected from alkyl groups, cycloalkyl groups, and aryl groups. Moreover, it is preferable for a substance from which the dispersion polymer is formed to have one or more hydrophilic groups selected from carboxyl groups, sulfonic acid groups, hydroxyl groups, amino groups, amide groups, and salts thereof. As specific examples of substances for forming such a dispersion polymer, monomers or oligomers having a double-bond-containing acryloyl group, methacryloyl group, vinyl group or allyl group can be used. For example, compounds having acryl group(s) or methacryl group(s) can be used, e.g. monofunctional compounds such as styrene, tetrahydrofurfuryl acrylate, butyl methacrylate, ($\alpha$, 2, 3 or 4)-alkylstyrenes, ($\alpha$, 2, 3 or 4)-alkoxystyrenes, 3,4-dimethylstyrene, $\alpha$-phenylstyrene, divinylbenzene, vinylnaphthalene, dimethylamino (meth)acrylate, dimethylamino ethyl (meth)acrylate, dimethylamino propyl acrylamide, N,N-dimethylamino ethyl acrylate, acryloyl morpholine, N,N-dimethyl acrylamide, N-isopropyl acrylamide, N,N-diethyl acrylamide, methyl (meth)acrylate, ethyl (meth)acrylate, propyl (meth)acrylate, ethylhexyl (meth) acrylate, other alkyl (meth)acrylates, methoxy diethyleneglycol (meth)acrylate, diethylene glycol or polyethylene glycol (meth)acrylate having an ethoxy group, a propoxy group or a butoxy group, cylohexyl (meth)acrylate, benzyl (meth) acrylate, phenoxyethyl (meth)acrylate, isobornyl (meth) acrylate, hydroxyalkyl (meth)acrylates, other fluorine-containing, chlorine-containing and silicon-containing (meth) acrylates, (meth)acrylamide, maleic acid amide, and (meth) acrylic acid, and in the case of introducing a cross-linked structure, (mono, di, tri, tetra, or poly) ethylene glycol di(meth)acrylate, (meth)acrylates of 1,4-butanediol, 1,5-pentanediol, 1,6-hexanediol, 1,8-octanediol, 1,10-decanediol and so on, trimethylolpropane tri(meth)acrylate, glycerol (di or tri)(meth)acrylate, di(meth)acrylates of ethylene oxide-added bisphenol A or F, neopentyl glycol di meth)acrylate, pentaerythritol tetra(meth)acrylate, and dipentaerythritol hexa(meth)acrylate.

Moreover, the manufacture can be carried out while adding such polymers, making at least one selected from the group consisting of polyacrylic acid esters, styrene-acrylic acid copolymers, polystyrenes, polyesters, polyamides, polyimides, silicon-containing polymers, and sulfur-containing polymers be a principal component.

As a polymerization initiator, one that is commonly used in radical polymerization can be used, for example potassium persulfate or ammonium persulfate, or else hydrogen persulfate, azobis isobutyronitrile, azobis isovaleronitrile, azobis acetoxy phenylethane, azobis methyl butanamide dihydrochloride tetrahydrate, azobis methyl butyronitrile, azobis cyclohexane carbonitrile, dimethyl azobis isobutyrate, azobis cyano valeric acid, benzoyl peroxide, dibutyl peroxide, peracetic acid, cumene hydroperoxide, t-butyl hydroxyperoxide, or para-menthane hydroxyperoxide.

A chain transfer agent can be used in the emulsion polymerization in Embodiment A. An example is t-dodecylmercaptan, with other examples being n-dodecylmercaptan, n-octylmercaptan, dimethylxanthogen disulfide and diisobutylxanthogen disulfide (which are xanthogens), dipentene, indene, 1,4-cyclohexadiene, dihydrofuran, xanthene, and so on.

By using a dispersion as described above, an ink jet recording ink having excellent stability can be obtained. Furthermore, a dispersion as described above can also be suitably used in an ink for pens.

Moreover, it is preferable for the polarity of the ions of the polymer fine particles to be the same as that of the dispersion. In the case of different polarities, coagulation or the like will be brought about, and hence it will be difficult to obtain a stable water-based ink. Furthermore, the difference in pH at the isoelectric point is preferably not more than ±2.

In the case of using the water-based ink as an ink jet recording ink, the amount of the pigment is preferably 0.5 to 30 wt %, more preferably 1.0 to 12 wt %. If the amount added is less than this, then it will no longer be possible to secure good print density, whereas if the amount added exceeds this, then the viscosity of the ink will rise or structural viscosity will arise in the viscosity characteristic, and hence there will be a tendency for the discharge stability of the ink from the ink jet head to be poor.

Regarding the method of dispersing the pigment, a dispersion method using ultrasonic dispersion, a bead mill, a sand mill, a roll mill, a nanomizer, a jet mill or the like can be used.

The above-mentioned surfactant is preferably at least one selected from acetylenic glycol type surfactants, acetylenic alcohol type surfactants, and silicone type surfactants. Such surfactants enable blurring of characters printed on paper or the like to be reduced, and hence the print quality to be further improved.

It is preferable for at least one substance selected from alkylene glycol monoalkyl ethers and 1,2-alkylene glycols to be included in the water-based ink. By adding such substances, blurring of characters printed on paper or the like can be reduced, and hence the print quality can be further improved.

In each of the alkylene glycol monoalkyl ethers, the alkylene glycol group preferably has not more than 10 repeat units, and the alkyl group preferably has 4 to 10 carbon atoms. If the alkyl group has fewer than 4 carbon atoms, then there will be no effect of improving the penetrability, whereas if the alkyl group has more than 10 carbon atoms, then a long-chain hydrophilic group will be necessary to obtain solubility in water, and hence the molecular weight will become high, and thus the viscosity will be prone to increasing, and moreover little effect as a penetrant will be obtained. More preferably, the alkyl group has 4 to 8 carbon atoms.

The alkylene glycol monoalkyl ethers are preferably at least one selected from the group consisting of diethylene glycol monobutyl ether, triethylene glycol monobutyl ether, propylene glycol monobutyl ether, and dipropylene glycol monobutyl ether. By using these, the print quality can be further improved.

Examples of the above-mentioned 1,2-alkylene glycols having 4 to 10 carbon atoms are 1,2-hexanediol, 4-methyl-1,2-pentanediol, 3-methyl-1,2-pentanediol, 2-methyl-1,2-pentanediol, 1-methyl-1,2-pentanediol, 3,3-dimethyl-1,2-butanediol, 1,2-pentanediol, 1,2-octanediol, and 1,2-decanediol.

The ink preferably contains at least one substance selected from diethylene glycol monobutyl ether, triethylene glycol monobutyl ether, propylene glycol monobutyl ether, dipropylene glycol monobutyl ether, and 1,2-alkylene glycols, wherein the amount added of these substances is 0.5 to 30 wt %.

The amount added of the at least one substance selected from acetylenic glycol type surfactants, acetylenic alcohol type surfactants, and silicone type surfactants is preferably 0.1 to 5 wt %. At less than 0.1 wt %, there will be little effect of reducing blurring, whereas if more than 5 wt % is added, the effect of reducing blurring will peak, and moreover the dispersion stability of the colorant will drop. The amount added is more preferably 0.3 to 2 wt %.

It is preferable for the ink to contain at least one substance selected from acetylenic alcohol type surfactants, acetylenic glycol type surfactants, and silicone type surfactants, and at least one substance selected from diethylene glycol monobutyl ether, triethylene glycol monobutyl ether, propylene glycol monobutyl ether, dipropylene glycol monobutyl ether, and 1,2-alkylene glycols. There are many types of regular paper such as PPC paper; there are types for which the at least one substance selected from acetylenic alcohol type surfactants, acetylenic glycol type surfactants, and silicone type surfactants has the stronger effect of reducing blurring, and there are types for which the at least one substance selected from diethylene glycol monobutyl ether, triethylene glycol monobutyl ether, propylene glycol monobutyl ether, dipropylene glycol monobutyl ether, and 1,2-alkylene glycols has the stronger effect of reducing blurring, and hence by using the two together, an effect of reducing blurring can be realized with many types of paper. More preferably, many substances selected from acetylenic alcohol type surfactants, acetylenic glycol type surfactants, silicone type surfactants, diethylene glycol monobutyl ether, triethylene glycol monobutyl ether, propylene glycol monobutyl ether, dipropylene glycol monobutyl ether, and 1,2-alkylene glycols are added.

Out of the above, the amount added of the at least one substance selected from acetylenic alcohol type surfactants, acetylenic glycol type surfactants, and silicone type surfactants is preferably 0.01 to 0.5 wt %, and the amount added of the at least one substance selected from diethylene glycol monobutyl ether, triethylene glycol monobutyl ether, propylene glycol monobutyl ether, dipropylene glycol monobutyl ether, and 1,2-alkylene glycols is preferably at least 1%.

The polymer enclosing the pigment in the dispersion that constitutes the colorant is preferably at least one selected from the group consisting of polyacrylic acid esters, styrene-acrylic acid copolymers, polystyrenes, polyesters, polyamides, polyimides, silicon-containing polymers, and sulfur-containing polymers.

Moreover, the amount added of the 1,2-alkylene glycol is preferably not more than 10 wt %.

The particle diameter of the above-mentioned polymer fine particles is preferably 10 to 500 nm, and the amount added thereof is preferably 0.1 to 20 wt %. If the particle diameter of the polymer fine particles is less than 10 nm, then it will become difficult to obtain dispersion stability, and hence it will become difficult to obtain good discharge stability. If the particle diameter of the polymer fine particles exceeds 500 nm, then again it will become difficult to obtain good discharge stability. The particle diameter is more preferably 20 to 300 nm, yet more preferably 50 to 200 nm. If the amount added of the polymer fine particles is less than 0.1 wt %, then there will be little effect of improving the fixability. However, regarding unevenness due to coagulation of the ink on specialist paper, there will be an effect even at less than 0.1 wt %. If the amount added of the polymer fine particles exceeds 20 wt %, then it will not be possible to obtain good discharge stability. To improve the fixability, the amount added of the polymer fine particles is preferably 1 to 10 wt %.

As substances for forming the emulsion having the polymer fine particles dispersed therein, compounds having acryl group(s) or methacryl group(s) can be used, e.g. monofunctional compounds such as styrene, tetrahydrofurfuryl acrylate, butyl methacrylate, (α, 2, 3 or 4)-alkylstyrenes, (α, 2, 3 or 4)-alkoxystyrenes, 3,4-dimethylstyrene, α-phenylstyrene, divinylbenzene, vinylnaphthalene, dimethylamino (meth)acrylate, dimethylamino ethyl (meth)acrylate, dimethylamino propyl acrylamide, N,N-dimethylamino ethyl acrylate, acryloyl morpholine, N,N-dimethyl acrylamide, N-isopropyl acrylamide, N,N-diethyl acrylamide, methyl (meth)acrylate, ethyl (meth)acrylate, propyl (meth)acrylate, ethylhexyl (meth)acrylate, other alkyl (meth)acrylates, methoxy diethyleneglycol (meth)acrylate, diethylene glycol or polyethylene glycol (meth)acrylate having an ethoxy group, a propoxy group or a butoxy group, cylohexyl (meth)acrylate, benzyl (meth)acrylate, phenoxyethyl (meth) acrylate, isobornyl (meth)acrylate, hydroxyalkyl (meth) acrylates, other fluorine-containing, chlorine-containing and silicon-containing (meth)acrylates, (meth)acrylamide, maleic acid amide, and (meth) acrylic acid, and in the case of introducing a cross-linked structure, (mono, di, tri, tetra, or poly) ethylene glycol di(meth)acrylate, (meth)acrylates of 1,4-butanediol, 1,5-pentanediol, 1,6-hexanediol, 1,8-octanediol, 1,10-decanediol and so on, trimethylolpropane tri(meth)acrylate, glycerol (di or tri)(meth)acrylate, di(meth) acrylates of ethylene oxide-added bisphenol A or F, neopentyl glycol di(meth)acrylate, pentaerythritol tetra(meth)acrylate, and dipentaerythritol hexa(meth)acrylate.

As an emulsifier used for forming the polymer fine particles, sodium lauryl sulfate or potassium lauryl sulfate, or else an activator that is a sulfate of an alkyl group such as a stearyl group, a nonyl group or an octyl group, a branched alkyl group, or an alkylphenyl group or the like, or else an activator that is a phosphate or a borate, or an anionic surfactant, a nonionic surfactant, or an amphoteric surfactant, or the like can be used.

As a polymerization initiator, one that is commonly used in radical polymerization can be used, for example potassium persulfate or ammonium persulfate, or else hydrogen persulfate, azobis isobutyronitrile, benzoyl peroxide, dibutyl peroxide, peracetic acid, cumene hydroperoxide, t-butyl hydroxyperoxide, or para-menthane hydroxyperoxide; since the polymerization reaction is carried out in water, it is preferable for the polymerization initiator to be water-soluble.

As a chain transfer agent for the polymerization, a common chain transfer agent can be used, for example t-dodecylmercaptan, or else n-dodecylmercaptan, n-octylmercaptan, dimethylxanthogen disulfide or diisobutylxanthogen disulfide (which are xanthogens), dipentene, indene, 1,4-cyclohexadiene, dihydrofuran, xanthene, or the like.

Moreover, in Embodiment A, a multi-phase example in which core-shell type polymer fine particles in which the core and the shell have different structures are used has been given, but the polymer fine particles may be single-phase. However, it is preferable to design the minimum film formation temperature (MFT) of the polymer fine particles to be below room temperature, or else make the MFT be below room temperature by using an MFT-reducing agent. Moreover, depending on the reaction conditions and so on, it may not be necessary to use the additives described above. For example, in the case of using a micelle-forming monomer, a micelle-forming agent is not required, and moreover depending on the reaction conditions, it may not be necessary to use a chain transfer agent; the additives used can thus be selected as appropriate.

With an objective of securing good storage stability, achieving stable discharge from an ink jet head and so on, various additives such as humectants, penetration controlling agents, viscosity regulators, pH regulators, dissolution aids, antioxidants, anti-mold agents, corrosion inhibitors and so on may be added to the ink jet recording ink of Embodiment A.

Following are examples of these additives for an ink jet ink, but there is no limitation thereto.

To inhibit drying at an ink jet nozzle surface or a pen tip, it is preferable to add a water-soluble glycol; examples include ethylene glycol, diethylene glycol, triethylene glycol, propylene glycol, dipropylene glycol, tripropylene glycol, polyethylene glycols having a molecular weight of not more than 2000, 1,3-propylene glycol, isopropylene glycol, isobutylene glycol, 1,4-butanediol, 1,3-butanediol, 1,5-pentanediol, 1,6-hexanediol, glycerol, meso-erythritol, and pentaerythritol.

Moreover, similarly, to prevent drying and clogging of the ink, any of various saccharides can be used. A monosaccharide or a polysaccharide can be used, with examples including glucose, mannose, fructose, ribose, xylose, arabinose, lactose, galactose, aldonic acid, glucitose, maltose, cellobiose, sucrose, trehalose, and maltotriose, and also alginic acid and salts thereof, cyclodextrins, and celluloses. The amount added thereof is preferably 0.05 to 30%. At less than 0.05%, there will be little effect of recovering from a clogging phenomenon in which the ink dries at the tip of the head and clogging occurs, whereas at more than 30%, the viscosity of the ink will rise and hence it will no longer be possible to carry out proper printing. The amount added for common monosaccharides and polysaccharides such as glucose, mannose, fructose, ribose, xylose, arabinose, lactose, galactose, aldonic acid, glucitose, maltose, cellobiose, sucrose, trehalose and maltotriose is more preferably 3 to 20%. With alginic acid and salts thereof, cyclodextrins, and celluloses, the amount added must be made to be such that the viscosity of the ink does not become too high.

In addition, examples of solvents that are miscible with water, and can be used to improve the solubility of glycol ethers or other ink components included in the ink that have low solubility in water, and also improve penetrability into recording media such as paper, or prevent nozzle or pen tip clogging include alkyl alcohols having 1 to 4 carbon atoms such as ethanol, methanol, butanol, propanol, and isopropanol, glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropyleneglycol mono-iso-propyl ether, propylene glycol mono-n-butyl ether, and dipropylene glycol mono-n-butyl ether, and formamide, acetoamide, dimethyl sulfoxide, sorbit, sorbitane, acetine, diacetine, triacetine, and sulfolane; these can be selected and used as appropriate.

Moreover, to further control the penetrability of the ink of Embodiment A into media such as paper and special paper, other surfactants may also be added. The added surfactants preferably have good compatibility with the ink system, and out of surfactants, ones that give good penetrability and are stable are preferable. Examples include amphoteric surfactants and nonionic surfactants. Example of amphoteric surfactants include lauryl dimethylaminoacetic acid betaine, 2-alkyl-N-carboxymethyl-N-hydroxyethyl imidazolinium betaines, coconut oil fatty acid amide propyl dimethylaminoacetic acid betaine, polyoctyl polyaminoethyl glycine, and other imidazoline derivatives. Examples of nonionic surfactants include ethers such as polyoxyethylene nonyl phenyl ether, polyoxyethylene octyl phenyl ether, polyoxyethylene dodecyl phenyl ether, polyoxyethylene alkyl allyl ethers, polyoxyethylene oleyl ether, polyoxyethylene lauryl ether, polyoxyethylene alkyl ethers, and polyoxyalkylene alkyl ethers (polyoxypropylene polyoxyethylene alkyl ethers), polyoxyethylene oleic acid, esters such as polyoxyethylene oleic acid ester, polyoxyethylene distearic acid ester, sorbitan laurate, sorbitan monostearate, sorbitan monooleate, sorbitan sesquioleate, polyoxyethylene monooleate, and polyoxyethylene stearate, and also fluorine-containing surfactants such as fluoroalkyl esters and perfluoroalkyl carboxylates.

Moreover, examples of pH regulators, dissolution aids and antioxidants include amines such as ethanolamine, diethanolamine, triethanolamine, propanolamine, triisopropanolamine, and morpholine, and modified compounds thereof, inorganic bases such as potassium hydroxide, sodium hydroxide, and lithium hydroxide, ammonium hydroxide, quaternary ammonium hydroxides (e.g. tetramethylammonium hydroxide), carbonates such as potassium carbonate or hydrogencarbonate, sodium carbonate or hydrogencarbonate, and lithium carbonate or hydrogencarbonate, and also phosphates, N-methyl-2-pyrrolidone, urea, urea derivatives such as thiourea and tetramethylurea, allophanate compounds such as allophanates and methylallophanates, biuret compounds such as biuret, dimethylbiuret and tetramethylbiuret, and L-ascorbic acid and salts thereof. Moreover, commercially sold antioxidants, ultraviolet absorbers and so on can also be used. Examples thereof include Tinuvin 328, 900, 1130, 384, 292, 123, 144, 622 and 770, Irgacor 252 and 153, and Irganox 1010, 1076, 1035 and MD1024 made by Ciba-Geigy, and also oxides of lanthanides.

Furthermore, examples of viscosity regulators include rosins, alginates, polyvinyl alcohol, hydroxypropylcellulose, carboxymethylcellulose, hydroxyethylcellulose, methylcellulose, polyacrylic acid salts, polyvinylpyrrolidone, and gum arabic starch.

Embodiment B

The present invention also provides, as another embodiment, a water-base ink comprising a colorant, water, a water-soluble organic solvent, a surfactant, and a chelating agent, wherein the chelating agent is methylglycine diacetic acid (MGDA) or a salt thereof, L-glutamine diacetic acid (GLDA) or a salt thereof, L-aspartic acid diacetic acid (ASDA) or a salt thereof, diethylenetriamine pentaacetic acid (DTPA) or a salt thereof, gluconic acid (GA) or a salt thereof, citric acid (CA) or a salt thereof, nitrilotripropionic acid (NTP) or a salt thereof, nitrilotrisphosphonic acid (NTPO) or a salt thereof, dihydroxyethylglycine (DHEG) or a salt thereof, hydroxyethyliminodiacetic acid (HIDA) or a salt thereof, 1,3-diamino-2-hydroxypropane tetraacetic acid (DPTA-OH) or a salt thereof, hydroxyethylidene diphosphonic acid (HEDP) or a salt thereof, nitrilotrimethylene phosphonic acid (NTMP) or a salt thereof, or phosphonobutane tricarboxylic acid (PBTC) or a salt thereof (water-based ink of Embodiment B).

The water-based ink of Embodiment B is like the water-based ink of Embodiment A described above, except that a chelating agent as specified above is used, and it is not an essential constituent feature that the colorant is a dispersion. Consequently, for the present Embodiment B, for items for which no particular description is given, the description given for Embodiment A earlier is deemed to apply as appropriate.

The water-based ink of Embodiment B is characterized in that a chelating agent as specified above is used. As with the chelating agent or salt thereof used in Embodiment A, such a chelating agent or a salt thereof is stable as a chelating agent in a liquid state such as in an ink, but on a recording medium such as paper, a dry state is formed, and hence the chelating agent or salt thereof is decomposed by OH radicals in the air and becomes safe; such a chelating agent or salt thereof is thus suitable for use in a water-based ink which ordinary people frequently come into contact with such as an ink jet ink.

Moreover, regarding the amount added of the chelating agent in the ink of Embodiment B, for methylglycine diacetic acid (MGDA) or a salt thereof, the amount added is preferably 0.001 to 0.1 wt %. For L-glutamine diacetic acid (GLDA) or a salt thereof, the amount added is preferably 0.001 to 0.1 wt %. For L-aspartic acid diacetic acid (ASDA) or a salt thereof, the amount added is preferably 0.001 to 0.1 wt %. For diethylenetriamine pentaacetic acid (DTPA) or a salt thereof, the amount added is preferably 0.001 to 0.1 wt %. For gluconic acid (GA) or a salt thereof, the amount added is preferably 0.001 to 0.5 wt %. For citric acid (CA) or a salt thereof, the amount added is preferably 0.001 to 0.5 wt %. For nitrilotripropionic acid (NTP) or a salt thereof, the amount added is preferably 0.001 to 0.2 wt %. For nitrilotrisphosphonic acid (NTPO) or a salt thereof, the amount added is preferably 0.001 to 0.2 wt %. For dihydroxyethylglycine (DHEG) or a salt thereof, the amount added is preferably 0.001 to 0.2 wt %. For hydroxyethyliminodiacetic acid (HIDA) or a salt thereof, the amount added is preferably 0.001 to 0.1 wt %. For 1,3-diamino-2-hydroxypropane tetraacetic acid (DPTA-OH) or a salt thereof, the amount added is preferably 0.001 to 0.1 wt %. For hydroxyethylidene diphosphonic acid (HEDP) or a salt thereof, the amount added is preferably 0.001 to 0.1 wt %. For nitrilotrimethylene phosphonic acid (NTMP) or a salt thereof, the amount added is preferably 0.001 to 0.1 wt %. For phosphonobutane tricarboxylic acid (PBTC) or a salt thereof, the amount added is preferably 0.001 to 0.1 wt %.

It is usually suitable to use a sodium salt of the chelating agent. In the case of using an anionic-dispersed pigment or polymer fine particles in particular, the pH will be on the alkaline side, and hence a mono- to tri-sodium salt is preferable. The counter ion is not limited to being sodium, but rather may also be a monovalent ion such as a potassium ion or a lithium ion, or an ammonium ion, an amine or the like. In the case that the amount added is less than that specified above, there will be little effect as a chelating agent, and hence it will no longer be possible to obtain stability due to hardness components such as calcium ions and magnesium ions originating from the pigment or at places of contact with the ink. There will be an effect as a chelating agent even if the amount added is more than that specified above, but it will become difficult to stably disperse the pigment and so on. Moreover, in the case of cationic dispersion, an acid not in the form of a salt can be used.

As the colorant in Embodiment B, for example a pigment dispersion or a disperse dye can be used. In the case of a pigment dispersion, the pigment may be made to be dispersible in water by being enveloped in a polymer, or may be dispersed without a dispersant. Moreover, by further adding polymer fine particles along with the dispersion, yet higher color density and coloration can be obtained, and moreover the fixability of the pigment onto a medium such as paper can be improved. In particular, adding polymer fine particles is ideal for improving the fixability in the case of a pigment that has been dispersed without using a dispersant.

The dispersion has excellent stability, and as with the dispersion used in Embodiment A, an ink can be manufactured that gives good coloration and little blurring on regular paper, gives adequate coloration on specialist paper, and has good fixability, and moreover it is possible to answer to the need for properties such as giving excellent discharge stability of the ink from an ink jet head with ink jet recording, exhibiting the effect of a chelating agent even in a small amount, and not being harmful due to evaporating, subliming or the like.

As the above-mentioned dye, a disperse dye, or else any of various other dyes such as an acid dye, a direct dye or a basic dye can be used. Moreover, as the above-mentioned pigment, an organic pigment or an inorganic pigment can be used. Regarding examples of the pigment (for a black ink or for a colored ink), preferable forms, and the particle diameter of the pigment, these are as with the pigment used in Embodiment A.

By using a colorant (pigment dispersion, disperse dye, or the like) as described above, an ink jet recording ink having excellent stability can be obtained. Furthermore, a dispersion or colorant as described above can also be suitably used in an ink for pens.

EXAMPLES

A description will now be given of specific examples.

Examples A

In the present examples, Pigment Black 7 was used as a first pigment, Pigment Blue 15:4 as a second pigment, Pigment Red 122 as a third pigment, and Pigment Yellow 74 as a fourth pigment. However, there is no limitation to these, with it being possible to use any of many organic or inorganic pigments. The mean particle diameters of the pigments are shown in nm (nanometers) in angular brackets '< >'. The mean particle diameters were measured by a light scattering method using a Zetasizer 3000 made by Malvern.

In the present examples, the pigments can be obtained by dispersing with a reactive dispersant, and then carrying out emulsion polymerization under the presence of a catalyst in water.

(Manufacture of Dispersions 1 to 4)

First, out of various types of Pigment Black 7, which is an inorganic pigment, Raven C (made by Columbian Carbon) was used for Dispersion 1. 25 parts by weight (hereinafter when merely 'parts' is stated, this means parts by weight) of Raven C, and 5 parts of Adeka Reasoap SE-10N made by Asahi Denka Co., Ltd., which is a polymerizable surfactant, were added to 180 parts of ion exchange water in a reaction vessel equipped with an ultrasound generator, a stirrer, a dropper, a water-cooled reflux condenser and a temperature regulator, and ultrasound was applied for 4 hours, thus carrying out dispersion.

Next, a methyl ethyl ketone solution of 5 parts of styrene, 1.6 parts of α-methylstyrene and 0.5 parts of azobis isobutyronitrile was further added, and a polymerization reaction was carried out for 8 hours at 70° C. The solution obtained was subjected to centrifugal filtration, the polymer-enveloped pigment was recovered, and filtration was further carried out using a 0.4 μm membrane filter, thus removing coarse particles. The polymer-enveloped pigment solution was loosened using a homogenizer to carry out re-dispersion.

A methyl ethyl ketone solution of the pigment was then put into the reaction vessel, 27 parts of ion exchange water and 0.05 parts of sodium lauryl sulfate were further added, 100 parts of ion exchange water and 0.5 parts of potassium persulfate as a polymerization initiator were put in, and the mixture was held at 70° C. under a nitrogen atmosphere. Next, a mixed solution having therein 25 parts of styrene, 1 part of tetrahydrofurfuryl methacrylate, 15 parts of butyl methacrylate, 5 parts of triethylene glycol methacrylate and 0.02 parts of t-dodecyl mercaptan was instilled in and reaction was carried out, and then some of the methyl ethyl ketone and water was distilled off using a rotary evaporator, neutralization was carried out with sodium hydroxide to adjust the pH to 8.5, and then filtration was carried out using a 0.3 μm filter, whereby Dispersion 1 was obtained.

The zeta potential at pH 8.5 of some of Dispersion 1 was measured to be −50 mV using a Zetasizer 3000 made by Malvern (UK).

Dispersions 2 to 4 were obtained using a similar procedure to the above. For Dispersion 2, Pigment Blue 15:3 (a copper phthalocyanine pigment, made by Clariant), which is an organic pigment, was used. For Dispersion 3, Pigment Red 122 (a dimethyl quinacridone pigment, made by Clariant), which is an organic pigment, was used. For Dispersion 4, Pigment Yellow 74 (a condensed azo pigment, made by Clariant), which is an organic pigment, was used. Upon measuring the zeta potential at pH 8.5, the result was −48 mV for Dispersion 2, −46 mV for Dispersion 3, and −51 mV for Dispersion 4.

(Manufacture of Dispersions 5 to 8)

First, for Dispersion 5, the same method as in Japanese Patent Application Laid-open No. 8-3498 was used, except that Monarch 880 (made by Cabot Corporation), which is a carbon black, was used. The zeta potential at pH 8.5 of some of Dispersion 5 was measured to be −53 mV using a Zetasizer 3000 made by Malvern (UK).

For Dispersion 6, Pigment Blue 15:4 (a copper phthalocyanine pigment, made by Clariant) was used. A reaction vessel equipped with a stirrer, a thermometer, a reflux tube and a dropping funnel was purged with nitrogen, and then 20 parts of styrene, 5 parts of α-methylstyrene, 15 parts of butyl methacrylate, 10 parts of lauryl methacrylate, 2 parts of acrylic acid, and 0.3 parts of t-dodecyl mercaptan were put in, heating was carried out to 70° C., a separately prepared mixture of 150 parts of styrene, 15 parts of acrylic acid, 50 parts of butyl methacrylate, 1 part of t-dodecyl mercaptan, 20 parts of methyl ethyl ketone and 3 parts of azobis isobutyronitrile was put into the dropping funnel, and was instilled into the reaction vessel over 4 hours, thus obtaining a dispersion polymer through a polymerization reaction. Next, methyl ethyl ketone was added to the reaction vessel, thus preparing a 40%-concentration dispersion polymer solution.

40 parts of the above dispersion polymer solution, 30 parts of Pigment Blue 15:4, 100 parts of a 0.1 mol/L sodium hydroxide aqueous solution, and 30 parts of methyl ethyl ketone were mixed together, and stirring was carried out for 30 minutes using a homogenizer. After that, 300 parts of ion exchange water was added, and stirring was carried out for a further 1 hour. All of the methyl ethyl ketone and some of the water was then distilled off using a rotary evaporator, neutralization was carried out with 0.1 mol/L sodium hydroxide to adjust the pH to 9, and then filtration was carried out using a 0.3 μm membrane filter, whereby Dispersion 6, which had a solid content (dispersion polymer plus Pigment Blue 15:4) of 20%, was obtained. The zeta potential at pH 8.5 of some of Dispersion 6 was measured to be −51 mV using a Zetasizer 3000 made by Malvern (UK).

Dispersions 7 and 8 were obtained using a similar procedure to the above. For Dispersion 7, Pigment Red 122 (a dimethyl quinacridone pigment, made by Clariant) was used. For Dispersion 8, Pigment Yellow 180 (diketopyrrolopyrrole, made by Clariant) was used. Upon measuring the zeta potential at pH 8.5, the result was −49 mV for Dispersion 7, and −48 mV for Dispersion 8.

(Manufacture of Polymer Fine Particles)

100 parts of ion exchange water was put into a reaction vessel equipped with a dropper, a thermometer, a water-cooled reflux condenser and a stirrer, and 0.2 parts by weight of potassium persulfate as a polymerization initiator was added at 70° C. under a nitrogen atmosphere while stirring. A monomer solution comprising 0.05 parts of sodium lauryl sulfate, 15 parts of styrene, 6 parts of tetrahydrofurfuryl acrylate, 5 parts of butyl methacrylate and 0.02 parts of t-dodecyl mercaptan in 7 parts of ion exchange water was instilled in at 70° C., and reaction was carried out, thus preparing a primary substance. 2 parts of a 10% ammonium persulfate solution was added to this primary substance and stirring was carried out, and then a reaction liquid comprising 30 parts of ion exchange water, 0.2 parts of potassium lauryl sulfate, 30 parts of styrene, 25 parts of butyl methacrylate, 6 parts of butyl acrylate, 2 parts of acrylic acid, 1 part of 1,6-hexanediol dimethacrylate and 0.5 parts of t-dodecyl mercaptan was added at 70° C. while stirring, thus carrying out a polymerization reaction; neutralization was then carried out with sodium hydroxide to make the pH 8.5, and filtration was carried out using a 0.3 μm filter, thus preparing a 30% polymer fine particle aqueous solution, which was taken as Emulsion A. The zeta potential at pH 8.5 of some of Emulsion A was measured to be −48 mV using a Zetasizer 3000 made by Malvern (UK).

(Ink Jet Ink Preparation Examples)

Following are examples of suitable compositions for ink jet recording inks according to Embodiment A of the present invention. The amount added of each dispersion is shown in terms of the weight of solids (total amount of pigment plus dispersion polymer enveloping pigment). The particle diameter of each pigment is shown in nm in angular brackets '< >'. Also shown are the results of measuring the zeta potential at the stated pH for some of each ink of the stated composition (in a state in which the dispersion and the polymer fine particles have been mixed together) using a Zetasizer 3000 made by Malvern (UK).

<Preparation of ink jet recording inks>

| Ink aqueous solution | Amount added (%) |
|---|---|
| 1,2-hexanediol | 2.5 |
| Triethylene glycol monobutyl ether | 1.0 |
| Olfine E1010 (made by Nissin Chemical Industry) | 0.6 |
| 2-pyrrolidone | 2.0 |
| Triethylene glycol | 2.0 |
| Trimethylol propane | 5.0 |
| Glycerol | 8.0 |
| Nitrilotriacetic acid disodium salt | 0.02 |
| Benzotriazole | 0.01 |
| Benzoin thiazolone | 0.05 |
| Ion exchange water | 21.37 |

-continued

<Preparation of ink jet recording inks>

| | Amount added (wt %) |
|---|---|
| Example A1 | |
| Dispersion 1 <105> | 7.5 |
| Above-mentioned ink aqueous solution | 40.0 |
| Above-mentioned polymer fine particles | 4.0 |
| Triethanolamine | 0.8 |
| Ion exchange water | Remainder |
| Zeta potential −50 mV (pH 8.9) | |
| Example A2 | |
| Dispersion 2 <85> | 4.5 |
| Above-mentioned polymer fine particles | 4.0 |
| Above-mentioned ink aqueous solution | 40.0 |
| Ion exchange water | Remainder |
| Zeta potential −48 mV (pH 9.3) | |
| Example A3 | |
| Dispersion 3 <90> | 5.5 |
| Above-mentioned ink aqueous solution | 40.0 |
| Above-mentioned polymer fine particles | 4.0 |
| Ion exchange water | Remainder |
| Zeta potential −49 mV (pH 9.0) | |
| Example A4 | |
| Dispersion 4 <80> | 5.0 |
| Above-mentioned ink aqueous solution | 40.0 |
| Above-mentioned polymer fine particles | 4.0 |
| Ion exchange water | Remainder |
| Zeta potential −49 mV (pH 9.0) | |
| Example A5 | |
| Dispersion 1 <105> | 3.0 |
| Above-mentioned ink aqueous solution | 40.0 |
| Above-mentioned polymer fine particles | 8.0 |
| Triethanolamine | 0.9 |
| Ion exchange water | Remainder |
| Zeta potential −48 mV (pH 8.6) | |

-continued

<Preparation of ink jet recording inks>

| Example A6 | |
|---|---|
| Dispersion 2 <90> | 5.0 |
| Above-mentioned polymer fine particles | 3.0 |
| Above-mentioned ink aqueous solution | 40.0 |
| Ion exchange water | Remainder |
| Zeta potential −49 mV (pH 9.4) | |
| Example A7 | |
| Dispersion 3 <90> | 5.0 |
| Above-mentioned polymer fine particles | 3.0 |
| Above-mentioned ink aqueous solution | 40.0 |
| Ion exchange water | Remainder |
| Zeta potential −49 mV (pH 8.8) | |
| Example A8 | |
| Dispersion 4 <95> | 5.5 |
| Above-mentioned polymer fine particles | 3.0 |
| Above-mentioned ink aqueous solution | 40.0 |
| Ion exchange water | Remainder |
| Zeta potential −47 mV (pH 9.5) | |

Table 1 shows the initial amounts of calcium ions, magnesium ions and aluminum ions in the prepared inks, and the relationship between the amount added of nitrilotriacetic acid (NTA) disodium salt or, as comparative examples, ethylenediamine tetraacetic acid (EDTA) disodium salt and the storage stability of the inks. For the storage stability, each of the inks of Examples A1 to A8 was put into a glass ampoule and the ampoule was sealed, and then the ampoule was left at 70° C. for 1 month; a value of viscosity after leaving/initial viscosity of less than 1.02 was taken as A, 1.02 to 1.05 was taken as B, 1.05 to 1.10 was taken as C, and more than 1.10 was taken as D. Note that the amounts of calcium ions, magnesium ions and aluminum ions in the inks of Examples A1 to A8 were measured by ICP emission spectroscopy (using a P4010 made by Hitachi, Ltd.).

TABLE 1

RELATIONSHIP BETWEEN AMOUNT ADDED OF NITRILOTRIACETIC ACID (NTA) DISODIUM SALT OR ETHYLENEDIAMINE TETRAACETIC ACID (EDTA) DISODIUM SALT (UNITS: ppm) AND STORAGE STABILITY

| | EXAMPLE | Ca | Mg | Al | 0 | 10 | 20 | 50 | 100 | 200 | 300 | 500 | 1000 |
|---|---|---|---|---|---|---|---|---|---|---|---|---|---|
| NTA | 1 | 200 | 110 | 30 | D | C | C | B | B | B | A | A | A |
| | 2 | 180 | 90 | 15 | D | D | C | C | B | B | B | A | A |
| | 3 | 150 | 80 | 20 | D | D | C | C | B | B | B | A | A |
| | 4 | 180 | 70 | 35 | D | D | C | C | B | B | B | A | A |
| | 5 | 250 | 100 | 25 | D | C | C | B | B | B | A | A | A |
| | 6 | 205 | 95 | 15 | D | D | C | C | B | B | B | A | A |
| | 7 | 180 | 60 | 10 | D | D | C | C | B | B | B | A | A |
| | 8 | 190 | 80 | 35 | D | D | C | C | B | B | B | A | A |
| EDTA | 1 | 200 | 110 | 30 | D | C | C | C | B | B | A | A | A |
| | 2 | 180 | 90 | 15 | D | D | D | C | B | B | B | A | B |
| | 3 | 150 | 80 | 20 | D | D | C | C | C | B | B | B | C |
| | 4 | 180 | 70 | 35 | D | D | D | C | C | B | B | A | B |
| | 5 | 250 | 100 | 25 | D | C | C | B | B | A | A | A | A |
| | 6 | 205 | 95 | 15 | D | D | D | C | C | B | B | A | A |
| | 7 | 180 | 60 | 10 | D | D | C | C | C | B | B | B | C |
| | 8 | 190 | 80 | 35 | D | D | C | C | B | B | A | A | B |

From the results in Table 1, it can be seen that by adding the nitrilotriacetic acid salt, long-term storage stability was secured. Moreover, it can be seen that when the amount added of the nitrilotriacetic acid salt is 100 ppm (0.01%), there is an effect of almost eliminating the influence of calcium ions, magnesium ions and aluminum ions, which are generally present having originated from the pigment, and the storage stability is excellent. It can be seen that in the case of the ethylenediamine tetraacetic acid salt, it is necessary to add at least 200 ppm, and that depending on the pigment, the storage stability may drop if the amount added is high.

As printing evaluation results, Table 2 shows the results of evaluation of blurring in the case of printing characters. Single dots were formed using an MJ930C ink jet printer made by Seiko Epson Corporation, and evaluation was carried out using the value of r2/r1 averaged over 10 dots, where r1 is the minimum radius and r2 is the maximum radius of the dot. In Table 2, $r2/r1 \leq 2$ is shown as A, $2 < r2/r1 \leq 3$ as B, $3 < r2/r1 \leq 4$ as C, and $4 < r2/r1$ as D.

TABLE 2

PRINT QUALITY EVALUATION RESULTS

| | EXAMPLES A | | | | | | | |
|---|---|---|---|---|---|---|---|---|
| | 1 | 2 | 3 | 4 | 5 | 6 | 7 | 8 |
| Conqueror | A | A | A | A | A | A | A | A |
| Favorit | A | A | A | A | A | A | A | A |
| Modo Copy | A | A | A | A | A | A | A | A |
| Rapid Copy | A | A | A | A | A | A | A | A |
| EPSON EPP | A | A | A | A | A | A | A | A |
| Xerox P | A | A | A | A | A | A | A | A |
| Xerox 4024 | A | A | A | A | A | A | A | A |
| Xerox 10 | A | A | A | A | A | A | A | A |
| Neenha Bond | A | A | A | A | A | A | A | A |
| Ricopy6200 | A | A | A | A | A | A | A | A |
| yamayuri | A | A | A | A | A | A | A | A |
| Xerox R | A | A | A | A | A | A | A | A |

From the results in Table 2, it can be seen that if an ink jet recording ink according to the present invention is used, then the print quality is good, i.e. printing is good even if a nitrilotriacetic acid salt is used.

Note that the types of paper used in the evaluation were Conqueror, Favorit, Modo Copy, Rapid Copy, Epson EPP, Xerox 4024, Xerox 10, Neenha Bond, Ricopy 6200, Yamayuri and Xerox R, which are types of regular paper commercially sold in Europe, America and Japan.

As shown above, according to the present invention, a high-quality ink jet recording ink for which blurring of characters and images on recording media such as paper is reduced can be provided.

Moreover, each of the inks of Examples A1 to A8 was put into a glass sample bottle, and the sample bottle was sealed, and then left at 60° C. for 1 week; generated foreign matter and material values (viscosity, surface tension) were examined before and after the leaving.

The results were that for all of the inks there was virtually no generation of foreign matter or change in the material values, and hence storage stability is good even if a nitrilotriacetic acid salt is used.

Moreover, Table 3 shows the results of examining generated foreign matter, material values (viscosity, surface tension) and discharge stability for the case of changing the additives and whether or not the nitrilotriacetic acid salt is present in the case of the composition of Example A1. In this case, as in Table 1, 200 ppm of calcium, 110 ppm of magnesium and 30 ppm of aluminum were contained. The compositions not containing the nitrilotriacetic acid salt were taken as comparative examples. Specifically, instead of the TEGmBE (1.0%) and Olfine E1010 (0.6%) in the composition of Example A1, other additives (one or more substances selected from acetylenic alcohol type surfactants, acetylenic glycol type surfactants, silicone type surfactants, diethylene glycol monobutyl ether, triethylene glycol monobutyl ether, propylene glycol monobutyl ether, dipropylene glycol monobutyl ether, and 1,2 alkylene glycols) that are considered to be suitable in the present invention were used, or additives (one or more substances selected from acetylenic alcohol type surfactants, acetylenic glycol type surfactants, silicone type surfactants, diethylene glycol monobutyl ether, triethylene glycol monobutyl ether, propylene glycol monobutyl ether, dipropylene glycol monobutyl ether, and 1,2 alkylene glycols) that are considered to be suitable in the present invention were added to inks prepared with the weight proportions changed and inks of comparative examples, and for these cases (Examples A9 to A18 and the corresponding comparative examples in Table 3), the ink was similarly left at 60° C. for 1 week, and generated foreign matter, material values (viscosity, surface tension) and discharge stability were examined after the leaving; the results are shown in Table 3. For the amount of foreign matter generated, the value of (amount of foreign matter after leaving at 60° C.)/(initial amount of foreign matter) is shown, for the viscosity, the value of (viscosity after leaving at 60° C.)/(initial viscosity) is shown, and for the surface tension, the value of (surface tension after leaving at 60° C.)/(initial surface tension) is shown; for the discharge stability, continuous printing of 100 pages was carried out on A4-size Xerox P paper using a PM-900C ink jet printer made by Seiko Epson Corporation, and in the case that print disturbance and so on did not occur at all, the evaluation was taken as A, in the case that there was print disturbance at fewer than 10 places, the evaluation was taken as B, in the case that there was print disturbance at at least 10 places but fewer than 100 places, the evaluation was taken as C, and in the case that there was print disturbance at at least 100 places, the evaluation was taken as D. In Table 3, DEGmBE is diethylene glycol monobutyl ether, TEGmBE is triethylene glycol monobutyl ether, PGmBE is propylene glycol monobutyl ether, DPGmBE is dipropylene glycol monobutyl ether, 1,2-HD is 1,2-hexanediol, 1,2-PD is 1,2-pentanediol, 1,2-OD is 1,2-octanediol, 4-M-1,2-PD is 4-methyl-1,2-pentanediol, Olfine E1010 is an acetylenic glycol type surfactant (made by Nissin Chemical Industry Co., Ltd.), Olfine STG is also an acetylenic glycol type surfactant (made by Nissin Chemical Industry Co., Ltd.), Surfynol 61 is an acetylenic glycol type surfactant (made by Air Products and Chemicals Inc.), and BYK 347 is a silicone type surfactant (made by BYK-Chemie).

TABLE 3

GENERATED FOREIGN MATTER, MATERIAL VALUES
(VISCOSITY, SURFACE TENSION) AND DISCHARGE
STABILITY FOR THE CASE OF CHANGING ADDITIVES
AND PRESENCE/ABSENCE OF NITRILOTRIACETIC
ACID SALT WITH THE COMPOSITION OF EXAMPLE A1

| ADDITIVE | EXAMPLES A | 9 | 10 | 11 | 12 | 13 | 14 | 15 | 16 | 17 | 18 |
|---|---|---|---|---|---|---|---|---|---|---|---|
| DEGmBE | | 5 | | 5 | | | 6 | 10 | | | |
| TEGmBE | | | 8 | | 7 | | | | 8 | | |
| PGmBE | | | | 2 | | | | | | | |
| DPGmBE | | | | | 2 | | | 2 | | | |
| 1,2-HD | | | | | | 3 | | | 2 | | 2 |
| 1,2-PD | | | | | | | 5 | | | | 5 |
| 4-M-1,2-PD | | 1 | | | | | | | 1 | | |
| 1,2-OD | | | | | | 1 | | | | | 0.5 |
| OLFINE E1010 | | | 1 | 1 | | 1 | | | | 1 | |
| OLFINE STG | | 0.5 | | | | | | 1 | 0.5 | | |
| SURFYNOL 61 | | | | | | | | 0.5 | 0.5 | | |
| BYK 347 | | 0.2 | | | | | | | | 0.2 | |
| EXAMPLES 1 | GENERATED FOREIGN MATTER | 1 | 1 | 1 | 1 | 1 | 1 | 1 | 1 | 1 | 1 |
| | VISCOSITY | 1 | 1 | 1 | 1 | 1 | 1 | 1 | 1 | 1 | 1 |
| | SURFACE TENSION | 1 | 1 | 1 | 1 | 1 | 1 | 1 | 1 | 1 | 1 |
| | DISCHARGE STABILITY | A | A | A | A | A | A | A | A | A | A |
| COMPARATIVE EXAMPLES 1 | GENERATED FOREIGN MATTER | 11 | 5 | 13 | 12 | 3 | 22 | 25 | 20 | 1.5 | 2.1 |
| | VISCOSITY | 5 | 4 | 4 | 3 | 1.3 | 10 | 24 | 23 | 1.3 | 2.5 |
| | SURFACE TENSION | 1.0 | 1.1 | 1 | 1 | 1 | 1 | 1.1 | 1.1 | 1 | 1 |
| | DISCHARGE STABILITY | D | D | D | D | C | D | D | D | C | C |

As can be seen from the results in Table 3, with the ink jet recording inks according to the present examples in which are used a nitrilotriacetic acid salt and one or more substances selected from acetylenic alcohol type surfactants, acetylenic glycol type surfactants, silicone type surfactants, diethylene glycol monobutyl ether, triethylene glycol monobutyl ether, propylene glycol monobutyl ether, dipropylene glycol monobutyl ether, and 1,2 alkylene glycols, print quality is good, and discharge stability and storage stability are excellent. Moreover, upon similarly changing the additives and carrying out tests for Examples A2 to A8, very similar results were obtained.

Moreover, Table 4 shows the results of evaluating the fixability for the inks of Examples A1 to A8, and for these inks with the polymer fine particle emulsion omitted, with these being taken as comparative examples. The evaluation of the fixability was carried out using regular paper (Xerox 4024 paper) and specialist paper (PM photographic paper), through a method in which the printed surface and the rear surface are placed on top of one another with a load of 300 g, the paper is moved at a speed of 1 m/s, and the situation with regard to ink detachment is observed. The results for immediately after printing, 5 minutes after printing, 1 hour after printing, 2 hours after printing, and 3 hours after printing are shown. In Table 4, A means that there was no detachment whatsoever, B means that there was slight detachment, C means that there was some detachment, with the ink moving onto the rear surface, and D means that there was considerable detachment, with the ink moving onto the rear surface.

TABLE 4

RUBBING RESISTANCE EVALUATION RESULTS

| | | | 1 | 2 | 3 | 4 | 5 | 6 | 7 | 8 |
|---|---|---|---|---|---|---|---|---|---|---|
| REGULAR PAPER | EXAMPLES A | IMMEDIATELY AFTER PRINTING | B | B | B | B | B | B | B | B |
| | | AFTER 5 MINUTES | A | A | A | A | A | A | A | A |
| | | AFTER 1 HOUR | A | A | A | A | A | A | A | A |
| | | AFTER 2 HOURS | A | A | A | A | A | A | A | A |
| | | AFTER 3 HOURS | A | A | A | A | A | A | A | A |
| | COMPARATIVE EXAMPLES | IMMEDIATELY AFTER PRINTING | B | B | B | B | B | B | B | B |
| | | AFTER 5 MINUTES | B | B | B | B | B | B | B | B |
| | | AFTER 1 HOUR | A | A | A | A | A | A | A | A |
| | | AFTER 2 HOURS | A | A | A | A | A | A | A | A |
| | | AFTER 3 HOURS | A | A | A | A | A | A | A | A |
| SPECIALIST PAPER | EXAMPLES A | IMMEDIATELY AFTER PRINTING | C | C | C | C | C | C | C | C |
| | | AFTER 5 MINUTES | B | B | B | B | B | B | B | B |
| | | AFTER 1 HOUR | A | A | A | A | A | A | A | A |
| | | AFTER 2 HOURS | A | A | A | A | A | A | A | A |
| | | AFTER 3 HOURS | A | A | A | A | A | A | A | A |

TABLE 4-continued

RUBBING RESISTANCE EVALUATION RESULTS

| | | 1 | 2 | 3 | 4 | 5 | 6 | 7 | 8 |
|---|---|---|---|---|---|---|---|---|---|
| COMPARATIVE EXAMPLES | IMMEDIATELY AFTER PRINTING | D | D | D | D | D | D | D | D |
| | AFTER 5 MINUTES | D | D | D | D | D | D | D | D |
| | AFTER 1 HOUR | C | C | C | C | C | C | C | C |
| | AFTER 2 HOURS | C | C | C | C | C | C | C | C |
| | AFTER 3 HOURS | B | B | B | B | B | B | B | B |

As can be seen from the results in Table 4, if polymer fine particles are added, then with the specialist paper in particular, fixability is good, with there being no detachment 1 hour after printing, and hence it can be seen that a nitrilotriacetic acid salt can be used even in an ink in which polymer fine particles are used.

Table 5 shows the zeta potential of the pigment dispersion, the zeta potential of the polymer fine particles, and the zeta potential in the state in which the microcapsules and the polymer fine particles have been mixed together for Examples A1 to A8, and the state of generation of foreign matter after leaving each of the inks at 70° C. for 7 days, with a pigment dispersion for which the absolute value of the zeta potential is low and a dispersion for which the difference in zeta potential with the polymer fine particles is large being taken as comparative examples. Regarding the foreign matter evaluation in Table 5, the ratio of the amount of foreign matter after leaving at 70° C. for 7 days to the initial amount of foreign matter is shown. Regarding the zeta potential measurements, the pH dependence of the zeta potential from pH 4 to pH 11 was measured using a Zetasizer 3000HS made by Malvern (UK) In Table 5, the values at pH9, which is a pH at which the particles can exist stably, are shown.

TABLE 5

ZETA POTENTIAL AND FOREIGN MATTER EVALUATION RESULTS

| | ZETA POTENTIAL (−mV) | | | |
|---|---|---|---|---|
| EXAMPLE A | MICRO-CAPSULES | POLYMER FINE PARTICLES | MIXTURE | FOREIGN MATTER EVALUATION |
| EXAMPLE 1 | 50 | 48 | 50 | 1 |
| EXAMPLE 2 | 48 | 48 | 47 | 1 |
| EXAMPLE 3 | 46 | 48 | 49 | 1 |
| EXAMPLE 4 | 51 | 48 | 49 | 1 |
| EXAMPLE 5 | 51 | 48 | 48 | 1 |
| EXAMPLE 6 | 48 | 48 | 49 | 1 |
| EXAMPLE 7 | 49 | 48 | 49 | 1 |
| EXAMPLE 8 | 52 | 48 | 47 | 1 |
| COMPARATIVE EXAMPLE 1 | 28 | | 28 | 10 |
| COMPARATIVE EXAMPLE 2 | 35 | 48 | 41 | 5 |

As can be seen from the results in Table 5, with a water-based ink according to the present invention, the storage stability is excellent, whereas if the absolute value of the zeta potential is low or the difference in the zeta potential with the polymer fine particles is large, then foreign matter is prone to occurring; it can also be seen that there are no adverse effects on the storage stability whatsoever upon using a nitrilotriacetic acid salt.

Examples B

Following is a description of the case of use as an ink jet recording ink in particular.

In the present examples B, the same pigments 1 to 4 as used in Examples A described above were used, the same Dispersions 1 to 4 as used in Examples A described above were used (with the pigment particle diameter adjusted as appropriate), and the same Emulsion A (30% polymer fine particle aqueous solution) as used in Examples A described above was used.

(Ink Jet Ink Preparation Examples)

Following are specific examples of suitable compositions for ink jet recording inks according to Embodiment B of the present invention. The amount added of each dispersion is shown in terms of the weight of solids (total amount of pigment plus dispersion polymer enveloping pigment). The particle diameter of each pigment is shown in nm in angular brackets '< >'.

| <Preparation of ink jet recording inks> | |
|---|---|
| Ink aqueous solution | Amount added (%) |
| 1,2-hexanediol | 2.5 |
| Triethylene glycol monobutyl ether | 1.0 |
| Olfine E1010 (made by Nissin Chemical Industry) | 0.6 |
| 2-pyrrolidone | 2.0 |
| Triethylene glycol | 2.0 |
| Trimethylol propane | 5.0 |
| Glycerol | 8.0 |
| Benzotriazole | 0.01 |
| Benzoin thiazolone | 0.05 |
| Ion exchange water | 21.37 |

| | Amount added (wt %) |
|---|---|
| Example B1 | |
| Dispersion 1 <105> | 7.5 |
| Above-mentioned ink aqueous solution | 40.0 |
| Above-mentioned polymer fine particles | 4.0 |
| Triethanolamine | 0.8 |
| Methylglycine diacetic acid disodium salt | 0.02 |
| Ion exchange water | Remainder |
| Example B2 | |
| Dispersion 2 <85> | 4.5 |
| Above-mentioned polymer fine particles | 4.0 |
| Above-mentioned ink aqueous solution | 40.0 |
| L-glutamine diacetic acid disodium salt | 0.02 |
| Ion exchange water | Remainder |

-continued

<Preparation of ink jet recording inks>

Example B3

| | |
|---|---|
| Dispersion 3 <90> | 5.5 |
| Above-mentioned ink aqueous solution | 40.0 |
| Above-mentioned polymer fine particles | 4.0 |
| L-aspartic acid diacetic acid disodium salt | 0.02 |
| Ion exchange water | Remainder |

Example B4

| | |
|---|---|
| Dispersion 4 <80> | 5.0 |
| Above-mentioned ink aqueous solution | 40.0 |
| Above-mentioned polymer fine particles | 4.0 |
| Diethylenetriamine pentaacetic acid disodium salt | 0.02 |
| Ion exchange water | Remainder |

Example B5

| | |
|---|---|
| Dispersion 1 <105> | 3.0 |
| Above-mentioned ink aqueous solution | 40.0 |
| Above-mentioned polymer fine particles | 8.0 |
| Triethanolamine | 0.9 |
| Gluconic acid disodium salt | 0.1 |
| Ion exchange water | Remainder |

Example B6

| | |
|---|---|
| Dispersion 2 <90> | 5.0 |
| Above-mentioned polymer fine particles | 3.0 |
| Above-mentioned ink aqueous solution | 40.0 |
| Citric acid disodium salt | 0.1 |
| Ion exchange water | Remainder |

Example B7

| | |
|---|---|
| Dispersion 3 <90> | 5.0 |
| Above-mentioned polymer fine particles | 3.0 |
| Above-mentioned ink aqueous solution | 40.0 |
| Nitrilotripropionic acid disodium salt | 0.02 |
| Ion exchange water | Remainder |

Example B8

| | |
|---|---|
| Dispersion 4 <95> | 5.5 |
| Above-mentioned polymer fine particles | 3.0 |
| Above-mentioned ink aqueous solution | 40.0 |
| Nitrilotrisphosphonic acid disodium salt | 0.02 |
| Ion exchange water | Remainder |

Example B9

| | |
|---|---|
| Dispersion 1 <105> | 7.5 |
| Above-mentioned ink aqueous solution | 40.0 |
| Triethanolamine | 0.8 |
| Dihydroxyethylglycine disodium salt | 0.02 |
| Ion exchange water | Remainder |

Example B10

| | |
|---|---|
| Dispersion 2 <85> | 4.5 |
| Above-mentioned ink aqueous solution | 40.0 |
| Hydroxyethyliminodiacetic acid disodium salt | 0.02 |
| Ion exchange water | Remainder |

Example B11

| | |
|---|---|
| Dispersion 3 <90> | 5.5 |
| Above-mentioned ink aqueous solution | 40.0 |

-continued

<Preparation of ink jet recording inks>

| | |
|---|---|
| 1,3-diamino-2-hydroxypropane tetraacetic acid disodium salt | 0.02 |
| Ion exchange water | Remainder |

Example B12

| | |
|---|---|
| Dispersion 4 <80> | 5.0 |
| Above-mentioned ink aqueous solution | 40.0 |
| Hydroxyethylidene diphosphonic acid disodium salt | 0.02 |
| Ion exchange water | Remainder |

Example B13

| | |
|---|---|
| Dispersion 1 <105> | 7.5 |
| Above-mentioned ink aqueous solution | 40.0 |
| Triethanolamine | 0.8 |
| Nitrilotrimethylene phosphonic acid disodium salt | 0.02 |
| Ion exchange water | Remainder |

Example B14

| | |
|---|---|
| Dispersion 2 <85> | 4.5 |
| Above-mentioned ink aqueous solution | 40.0 |
| Phosphonobutane tricarboxylic acid disodium salt | 0.02 |
| Ion exchange water | Remainder |

Table 6 shows the initial amounts of calcium ions, magnesium ions and aluminum ions in the prepared inks, the amount added of methylglycine diacetic acid (MGDA) disodium salt, L-glutamine diacetic acid (GLDA) disodium salt, L-aspartic acid diacetic acid (ASDA) disodium salt, diethylenetriamine pentaacetic acid (DTPA) disodium salt, gluconic acid (GA) disodium salt, citric acid (CA) disodium salt, nitrilotripropionic acid (NTP) disodium salt, nitrilotrisphosphonic acid (NTPO) disodium salt, dihydroxyethylglycine (DHEG) disodium salt, hydroxyethyliminodiacetic acid (HIDA) disodium salt, 1,3-diamino-2-hydroxypropane tetraacetic acid (DPTA-OH) disodium salt, hydroxyethylidene diphosphonic acid (HEDP) disodium salt, nitrilotrimethylene phosphonic acid (NTMP) disodium salt, or phosphonobutane tricarboxylic acid (PBTC) disodium salt, and the storage stability of the water-based ink of each of the examples according to the present invention. For the storage stability, each of the inks of Examples B1 to B14 was put into a glass ampoule and the ampoule was sealed, and then the ampoule was left at 70° C. for 1 month; a value of viscosity after leaving/initial viscosity of less than 1.02 was taken as A, 1.02 to 1.05 was taken as B, 1.05 to 1.10 was taken as C, and more than 1.10 was taken as D. Note that the amounts of calcium ions, magnesium ions and aluminum ions in the inks of Examples B1 to B14 were measured by ICP emission spectroscopy (using a P4010 made by Hitachi, Ltd.).

TABLE 6

RELATIONSHIP BETWEEN AMOUNT ADDED OF ANY OF VARIOUS CHELATING AGENTS (UNITS: ppm) AND STORAGE STABILITY

| | EXAMPLE B | Ca | Mg | Al | 0 | 10 | 20 | 50 | 100 | 200 | 300 | 500 | 1000 |
|---|---|---|---|---|---|---|---|---|---|---|---|---|---|
| MGDA | 1 | 200 | 110 | 30 | D | C | C | B | B | B | A | A | A |
| GLDA | 2 | 180 | 90 | 15 | D | D | C | C | B | B | B | A | A |
| ASDA | 3 | 150 | 80 | 20 | D | D | C | C | B | B | B | A | A |
| DTPA | 4 | 180 | 70 | 35 | D | D | C | C | B | B | B | A | A |
| GA | 5 | 250 | 100 | 25 | D | C | C | C | C | B | A | A | A |
| CA | 6 | 205 | 95 | 15 | D | D | C | C | C | C | B | A | A |

TABLE 6-continued

RELATIONSHIP BETWEEN AMOUNT ADDED OF ANY OF VARIOUS
CHELATING AGENTS (UNITS: ppm) AND STORAGE STABILITY

| | EXAMPLE B | Ca | Mg | Al | 0 | 10 | 20 | 50 | 100 | 200 | 300 | 500 | 1000 |
|---|---|---|---|---|---|---|---|---|---|---|---|---|---|
| NTP | 7 | 180 | 60 | 10 | D | D | C | C | B | B | B | A | A |
| NTPO | 8 | 190 | 80 | 35 | D | D | C | C | B | B | B | A | A |
| DHEG | 9 | 100 | 60 | 15 | D | C | C | B | B | B | B | A | A |
| HIDA | 10 | 150 | 50 | 25 | D | D | C | C | B | B | B | A | A |
| DTPA-OH | 11 | 210 | 90 | 20 | D | D | C | C | B | B | B | A | A |
| HEDP | 12 | 165 | 85 | 15 | D | D | C | C | B | B | B | A | A |
| NTMP | 13 | 140 | 70 | 10 | D | D | C | B | B | B | B | A | A |
| BPTC | 14 | 150 | 60 | 25 | D | D | C | C | B | B | B | A | A |

From the results in Table 6, it can be seen that by adding methylglycine diacetic acid (MGDA) disodium salt, L-glutamine diacetic acid (GLDA) disodium salt, L-aspartic acid diacetic acid (ASDA) disodium salt, diethylenetriamine pentaacetic acid (DTPA) disodium salt, gluconic acid (GA) disodium salt, citric acid (CA) disodium salt, nitrilotripropionic acid (NTP) disodium salt, nitrilotrisphosphonic acid (NTPO) disodium salt, dihydroxyethylglycine (DHEG) disodium salt, hydroxyethyliminodiacetic acid (HIDA) disodium salt, 1,3-diamino-2-hydroxypropane tetraacetic acid (DPTA-OH) disodium salt, hydroxyethylidene diphosphonic acid (HEDP) disodium salt, nitrilotrimethylene phosphonic acid (NTMP) disodium salt, or phosphonobutane tricarboxylic acid (PBTC) disodium salt, long-term storage stability is secured (compare with the case of adding ethylenediamine tetraacetic acid (EDTA) disodium salt as a comparative example in Examples A described earlier (Table 1)). Moreover, it can be seen that when the amount added of any of the above chelating agents is within the range of the undermentioned examples, there is an effect of almost eliminating the influence of calcium ions, magnesium ions and aluminum ions, which are generally present having originated from the pigment, and the storage stability is excellent.

As printing evaluation results, Table 7 shows the results of evaluation of blurring in the case of printing characters. Single dots were formed using an MJ930C ink jet printer made by Seiko Epson Corporation, and evaluation was carried out using the value of r2/r1 averaged over 10 dots, where r1 is the minimum radius and r2 is the maximum radius of the dot. In Table 7, $r2/r1 \leq 2$ is shown as A, $2 < r2/r1 \leq 3$ as B, $3 < r2/r1 \leq 4$ as C, and $4 < r2/r1$ as D.

From the results in Table 7, it can be seen that if an ink jet recording ink according to the present invention is used, then the print quality is good, i.e. printing is good even if methylglycine diacetic acid (MGDA) disodium salt, L-glutamine diacetic acid (GLDA) disodium salt, L-aspartic acid diacetic acid (ASDA) disodium salt, diethylenetriamine pentaacetic acid (DTPA) disodium salt, gluconic acid (GA) disodium salt, citric acid (CA) disodium salt, nitrilotripropionic acid (NTP) disodium salt, nitrilotrisphosphonic acid (NTPO) disodium salt, dihydroxyethylglycine (DHEG) disodium salt, hydroxyethyliminodiacetic acid (HIDA) disodium salt, 1,3-diamino-2-hydroxypropane tetraacetic acid (DPTA-OH) disodium salt, hydroxyethylidene diphosphonic acid (HEDP) disodium salt, nitrilotrimethylene phosphonic acid (NTMP) disodium salt, or phosphonobutane tricarboxylic acid (PBTC) disodium salt is used.

Note that the types of paper used in the evaluation were Conqueror, Favorit, Modo Copy, Rapid Copy, Epson EPP, Xerox 4024, Xerox 10, Neenha Bond, Ricopy 6200, Yamayuri and Xerox R, which are types of regular paper commercially sold in Europe, America and Japan.

As shown above, according to the present invention, a high-quality ink jet recording ink for which blurring of characters and images on recording media such as paper is reduced can be provided.

Moreover, each of the inks of Examples B1 to B14 was put into a glass sample bottle, and the sample bottle was sealed, and then left at 60° C. for 1 week, generated foreign matter and material values (viscosity, surface tension) were examined before and after the leaving.

The results were that for all of the inks there was virtually no generation of foreign matter or change in the material

TABLE 7

PRINT QUALITY EVALUATION RESULTS

| | EXAMPLES B | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Conqueror | A | A | A | A | A | A | A | A | A | A | A | A | A | A |
| Favorit | A | A | A | A | A | A | A | A | A | A | A | A | A | A |
| Modo Copy | A | A | A | A | A | A | A | A | A | A | A | A | A | A |
| Rapid Copy | A | A | A | A | A | A | A | A | A | A | A | A | A | A |
| EPSON EPP | A | A | A | A | A | A | A | A | A | A | A | A | A | A |
| Xerox P | A | A | A | A | A | A | A | A | A | A | A | A | A | A |
| Xerox 4024 | A | A | A | A | A | A | A | A | A | A | A | A | A | A |
| Xerox 10 | A | A | A | A | A | A | A | A | A | A | A | A | A | A |
| Neenha Bond | A | A | A | A | A | A | A | A | A | A | A | A | A | A |
| Ricopy6200 | A | A | A | A | A | A | A | A | A | A | A | A | A | A |
| Yamayuri | A | A | A | A | A | A | A | A | A | A | A | A | A | A |
| Xerox R | A | A | A | A | A | A | A | A | A | A | A | A | A | A | values, and hence storage stability is good even if methylglycine diacetic acid (MGDA) disodium salt, L-glutamine diacetic acid (GLDA) disodium salt, L-aspartic acid diacetic acid (ASDA) disodium salt, diethylenetriamine pentaacetic acid (DTPA) disodium salt, gluconic acid (GA) disodium salt, citric acid (CA) disodium salt, nitrilotripropionic acid (NTP) disodium salt, nitrilotrisphosphonic acid (NTPO) disodium salt, dihydroxyethylglycine (DHEG) disodium salt, hydroxyethyliminodiacetic acid (HIDA) disodium salt, 1,3-diamino-2-hydroxypropane tetraacetic acid (DPTA-OH) disodium salt, hydroxyethylidene diphosphonic acid (HEDP) disodium salt, nitrilotrimethylene phosphonic acid (NTMP) disodium salt, or phosphonobutane tricarboxylic acid (PBTC) disodium salt is used.

Moreover, Table 8 shows the results of examining generated foreign matter, material values (viscosity, surface tension) and discharge stability for the case of changing the additives and whether or not the chelating agent (methylglycine diacetic acid (MGDA) disodium salt) is present in the case of the composition of Example B1. In this case, as in Table 6, 200 ppm of calcium, 110 ppm of magnesium and 30 ppm of aluminum were contained. The compositions not containing the chelating agent were taken as comparative examples. Specifically, instead of the TEGmBE (1.0%) and Olfine E1010 (0.6%) in the composition of Example B1, other additives (one or more substances selected from acetylenic alcohol type surfactants, acetylenic glycol type surfactants, silicone type surfactants, diethylene glycol monobutyl ether, triethylene glycol monobutyl ether, propylene glycol monobutyl ether, dipropylene glycol monobutyl ether, and 1,2-alkylene glycols) that are considered to be suitable in the present invention were used, or additives (one or more substances selected from acetylenic alcohol type surfactants, acetylenic glycol type surfactants, silicone type surfactants, diethylene glycol monobutyl ether, triethylene glycol monobutyl ether, propylene glycol monobutyl ether, dipropylene glycol monobutyl ether, and 1,2-alkylene glycols) that are considered to be suitable in the present invention were added to inks prepared with the weight proportions changed and inks of comparative examples, and for these cases (Examples B15 to B24 and the corresponding comparative examples in Table 8), the ink was similarly left at 60° C. for 1 week, and generated foreign matter, material values (viscosity, surface tension) and discharge stability were examined after the leaving; the results are shown in Table 8. For the amount of foreign matter generated, the value of (amount of foreign matter after leaving at 60° C.)/(initial amount of foreign matter) is shown, for the viscosity, the value of (viscosity after leaving at 60° C.)/(initial viscosity) is shown, and for the surface tension, the value of (surface tension after leaving at 60° C.)/(initial surface tension) is shown; for the discharge stability, continuous printing of 100 pages was carried out on A4-size Xerox P paper using an EM-930C ink jet printer made by Seiko Epson Corporation, and in the case that print disturbance and so on did not occur at all, the evaluation was taken as A, in the case that there was print disturbance at fewer than 10 places, the evaluation was taken as B, in the case that there was print disturbance at at least 10 places but fewer than 100 places, the evaluation was taken as C, and in the case that there was print disturbance at at least 100 places, the evaluation was taken as D. In Table 8, DEGmBE is diethylene glycol monobutyl ether, TEGmBE is triethylene glycol monobutyl ether, PGmBE is propylene glycol monobutyl ether, DPGmBE is dipropylene glycol monobutyl ether, 1,2-HD is 1,2-hexanediol, 1,2-PD is 1,2-pentanediol, 1,2-OD is 1,2-octanediol, 4-M-1,2-PD is 4-methyl-1,2-pentanediol, Olfine E1010 is an acetylenic glycol type surfactant (made by Nissin Chemical Industry Co., Ltd.), Olfine STG is also an acetylenic glycol type surfactant (made by Nissin Chemical Industry Co., Ltd.), Surfynol 61 is an acetylenic glycol type surfactant (made by Air Products and Chemicals Inc.), and BYK 347 is a silicone type surfactant (made by BYK-Chemie).

TABLE 8

GENERATED FOREIGN MATTER, MATERIAL VALUES (VISCOSITY, SURFACE TENSION) AND DISCHARGE STABILITY FOR THE CASE OF CHANGING ADDITIVES AND PRESENCE/ABSENCE OF CHELATING AGENT WITH THE COMPOSITION OF EXAMPLE B1

| ADDITIVE | EXAMPLES B | | 15 | 16 | 17 | 18 | 19 | 20 | 21 | 22 | 23 | 24 |
|---|---|---|---|---|---|---|---|---|---|---|---|---|
| DEGmBE | | | 5 | | 5 | | | 6 | 10 | | | |
| TEGmBE | | | | 8 | | 7 | | | | 8 | | |
| PGmBE | | | | | 2 | | | | | | | |
| DPGmBE | | | | | | 2 | | | 2 | | | |
| 1,2-HD | | | | | | | 3 | | | 2 | | 2 |
| 1,2-PD | | | | | | | | 5 | | | | 5 |
| 4-M-1,2-PD | | | 1 | | | | | | | 1 | | |
| 1,2-OD | | | | | | | 1 | | | | | 0.5 |
| OLFINE E1010 | | | | 1 | 1 | | 1 | | | | 1 | |
| OLFINE STG | | | 0.5 | | | | | | 1 | 0.5 | | |
| SURFYNOL 61 | | | | | | | | 0.5 | | 0.5 | | |
| BYK 347 | | | 0.2 | | | | | | | | 0.2 | |
| EXAMPLES 1 | GENERATED FOREIGN MATTER | | 1 | 1 | 1 | 1 | 1 | 1 | 1 | 1 | 1 | 1 |
| | VISCOSITY | | 1 | 1 | 1 | 1 | 1 | 1 | 1 | 1 | 1 | 1 |
| | SURFACE TENSION | | 1 | 1 | 1 | 1 | 1 | 1 | 1 | 1 | 1 | 1 |
| | DISCHARGE STABILITY | | A | A | A | A | A | A | A | A | A | A |
| COMPARATIVE EXAMPLES 1 | GENERATED FOREIGN MATTER | | 11 | 5 | 13 | 12 | 3 | 22 | 25 | 20 | 1.5 | 2.1 |
| | VISCOSITY | | 5 | 4 | 4 | 3 | 1.3 | 10 | 24 | 23 | 1.3 | 2.5 |
| | SURFACE TENSION | | 1.0 | 1.1 | 1 | 1 | 1 | 1 | 1.1 | 1.1 | 1 | 1 |
| | DISCHARGE STABILITY | | D | D | D | D | C | D | D | D | C | C |

As can be seen from the results in Table 8, with the ink jet recording inks according to the present examples in which are used methylglycine diacetic acid (MGDA) disodium salt, L-glutamine diacetic acid (GLDA) disodium salt, L-aspartic acid diacetic acid (ASDA) disodium salt, diethylenetriamine pentaacetic acid (DTPA) disodium salt, gluconic acid (GA) disodium salt, citric acid (CA) disodium salt, nitrilotripropionic acid (NTP) disodium salt, nitrilotrisphosphonic acid (NTPO) disodium salt, dihydroxyethylglycine (DHEG) disodium salt, hydroxyethyliminodiacetic acid (HIDA) disodium salt, 1,3-diamino-2-hydroxypropane tetraacetic acid (DPTA-OH) disodium salt, hydroxyethylidene diphosphonic acid (HEDP) disodium salt, nitrilotrimethylene phosphonic acid (NTMP) disodium salt, or phosphonobutane tricarboxylic acid (PBTC) disodium salt, and one or more substances selected from acetylenic alcohol type surfactants, acetylenic glycol type surfactants, silicone type surfactants, diethylene glycol monobutyl ether, triethylene glycol monobutyl ether, propylene glycol monobutyl ether, dipropylene glycol monobutyl ether, and 1,2 alkylene glycols, print quality is good, and discharge stability and storage stability are excellent. Moreover, upon similarly changing the additives and carrying out tests for Examples B2 to B8, very similar results were obtained.

Note that the present invention should not be considered as being limited to the above examples, but rather various modifications are possible so long as the gist of the present invention is not deviated from.

INDUSTRIAL APPLICABILITY

As described above, the present invention has an effect of providing a water-based ink that gives good coloration and little blurring on regular paper, gives adequate coloration on specialist paper, and has good fixability, and further gives excellent discharge stability with ink jet recording, and moreover exhibits the effect of a chelating agent even in a small amount, and is not harmful due to evaporating, subliming or the like.

The invention claimed is:

1. A water-based ink comprising a colorant, water, a water-soluble organic solvent, a surfactant, and a chelating agent, wherein said colorant is a dispersion in which a pigment has been made to be dispersible in water by being enveloped in a polymer or has been dispersed without a dispersant, and said chelating agent is nitrilotriacetic acid or a salt thereof.

2. The water-based ink according to claim 1, wherein said pigment is an organic pigment or an inorganic pigment.

3. The water-based ink according to claim 1, wherein the amount of the nitrilotriacetic acid or salt thereof is 0.001 to 0.1 wt %.

4. The water-based ink according to claim 1, further containing polymer fine particles.

5. A water-based ink comprising a colorant, water, a water-soluble organic solvent, a surfactant, and a chelating agent, wherein said chelating agent is methylglycine diacetic acid (MGDA) or a salt thereof, L-glutamine diacetic acid (GLDA) or a salt thereof, L-aspartic acid diacetic acid (ASDA) or a salt thereof, hydroxyethyliminodiacetic acid (HIDA) or a salt thereof, 1,3-diamino-2-hydroxypropane tetraacetic acid (DPTA-OH) or a salt thereof, nitrilotrimethylene phosphonic acid (NTMP) or a salt thereof, or phosphonobutane tricarboxylic acid (PBTC) or a salt thereof, wherein the amount of the methylglycine diacetic acid (MGDA) or salt thereof, L-glutamine diacetic acid (GLDA) or salt thereof, L-aspartic acid diacetic acid (ASDA) or salt thereof, hydroxyethyliminodiacetic acid (HIDA) or salt thereof, 1,3-diamino-2-hydroxypropane tetraacetic acid (DPTA-OH) or salt thereof, hydroxyethylidene diphosphonic acid (HEDP) or salt thereof, nitrilotrimethylene phosphonic acid (NTMP) or salt thereof, or phosphonobutane tricarboxylic acid (PBTC) or salt thereof is 0.001 to 0.1 wt %, and wherein said colorant is a dye, or a dispersion in which a pigment has been made to be dispersible in water by being enveloped in a polymer or has been dispersed without a dispersant.

6. A water-based ink comprising a colorant, water, a water-soluble organic solvent, a surfactant, and a chelating agent, wherein said chelating agent is gluconic acid (GA) or a salt thereof, or citric acid (CA) or salt thereof, wherein the amount of the gluconic acid (GA) or salt thereof, or citric acid (CA) or salt thereof is 0.001 to 0.5 wt %, and wherein said colorant is a dye, or a dispersion in which a pigment has been made to be dispersible in water by being enveloped in a polymer or has been dispersed without a dispersant.

7. A water-based ink comprising a colorant, water, a water-soluble organic solvent, a surfactant, and a chelating agent, wherein said chelating agent is nitrilotripropionic acid (NTP) or a salt thereof, or nitrilotrisphosphonic acid (NTPO) or a salt thereof, wherein the amount of the nitrilotripropionic acid (NTP) or salt thereof, or the nitrilotrisphosphonic acid (NTPO) or salt thereof, is 0.001 to 0.2 wt %, and wherein said colorant is a dye, or a dispersion in which a pigment has been made to be dispersible in water by being enveloped in a polymer or has been dispersed without a dispersant.

8. The water-based ink according to claim 5, containing said dispersion, and further containing polymer fine particles.

9. The water-based ink according to claim 4, wherein the absolute value of the zeta potential in a state in which said dispersion and said polymer fine particles have been mixed together is at least 30 mV.

10. The water-based ink according to claim 4, wherein the absolute value of the zeta potential of each of said dispersion and said polymer fine particles independently is at least 30 mV, and the absolute value of the difference between the zeta potential of said dispersion and the zeta potential of said polymer fine particles is not more than 10 mV.

11. The water-based ink according to claim 4, wherein the polarity of ions of said polymer fine particles is the same as that of said dispersion.

12. The water-based ink according to claim 4, wherein the particle diameter of said polymer fine particles is 10 to 500 nm, and the amount added of said polymer fine particles is 0.1 to 20 wt %.

13. The water-based ink according to claim 1, wherein said polymer in said dispersion that constitutes said colorant is at least one selected from the group consisting of polyacrylic acid esters, styrene-acrylic acid copolymers, polystyrenes, polyesters, polyamides, polyimides, silicon-containing polymers, and sulfur-containing polymers.

14. The water-based ink according to claim 1, wherein said surfactant is at least one substance selected from the group consisting of acetylenic alcohol type surfactants, acetylenic glycol type surfactants, and silicone type surfactants.

15. The water-based ink according to claim 14, wherein the amount added of the at least one substance selected from the group consisting of acetylenic alcohol type surfactants, acetylenic glycol type surfactants, and silicone type surfactants is 0.1 wt % to 5 wt %.

16. The water-based ink according to claim 1, wherein said water-soluble organic solvent is at least one selected from the group consisting of alkylene glycol monoalkyl ethers and 1,2-alkylene glycols.

17. The water-based ink according to claim 16, wherein in each of said alkylene glycol monoalkyl ethers, the alkylene glycol group has not more than 10 repeat units, and the alkyl group has 4 to 10 carbon atoms.

18. The water-based ink according to claim 17, wherein said alkylene glycol monoalkyl ethers are at least one selected from the group consisting of diethylene glycol monobutyl ether, triethylene glycol monobutyl ether, propylene glycol monobutyl ether, and dipropylene glycol monobutyl ether.

19. The water-based ink according to claim 16, wherein each of said 1,2-alkylene glycols is an optionally branched alkylene glycol having 4 to 10 carbon atoms.

20. The water-based ink according to claim 18, wherein the ink contains at least one substance selected from the group consisting of diethylene glycol monobutyl ether, triethylene glycol monobutyl ether, propylene glycol monobutyl ether, dipropylene glycol monobutyl ether, and 1,2-alkylene glycols, and the amount added of said at least one substance is 0.5 to 30 wt %.

21. The water-based ink according to claim 14, containing at least one substance selected from the group consisting of acetylenic glycol type surfactants, acetylenic alcohol type surfactants, and silicone type surfactants, and at least one substance selected from the group consisting of diethylene glycol monobutyl ether, triethylene glycol monobutyl ether, propylene glycol monobutyl ether, dipropylene glycol monobutyl ether, and 1,2-alkylene glycols.

* * * * *